United States Patent [19]

Tatemoto et al.

[11] Patent Number: 4,501,869

[45] Date of Patent: Feb. 26, 1985

[54] CROSS LINKABLE FLUORINE-CONTAINING POLYMER

[75] Inventors: Masayoshi Tatemoto, Ibaraki; Masahiko Oka, Ohtsu; Hideo Kano, Settsu; Masayasu Tomoda, Ohtsu; Yutaka Ueta, Toyonaka, all of Japan

[73] Assignee: Daikin Kogyo Co., Ltd., Osaka, Japan

[21] Appl. No.: 517,334

[22] Filed: Jul. 26, 1983

[30] Foreign Application Priority Data

Jul. 27, 1982 [JP] Japan ................................ 57-130781

[51] Int. Cl.$^3$ ........................................... C08F 214/16
[52] U.S. Cl. .................................. 526/249; 525/368; 525/369; 525/387; 525/330.7; 528/392; 568/682; 570/137; 204/159.11
[58] Field of Search ................ 526/249; 525/331, 368, 525/369, 387; 528/392; 568/683; 570/137

[56] References Cited

U.S. PATENT DOCUMENTS 4,214,060 6/1980 Apotheker et al. ................. 525/387
4,243,770 1/1981 Tatemoto et al. .................. 525/340

*Primary Examiner*—John Kight
*Assistant Examiner*—Marvin L. Moore

*Attorney, Agent, or Firm*—Birch, Stewart, Kolasch & Birch

[57] ABSTRACT

An easily cross linkable fluorine-containing polymer comprising: (1) a polymeric chain comprising one or more polymer segments, at least one polymer segment of which consists of units of at least one fluorine-containing ethylenically unsaturated compound having 2 to 8 carbon atoms, or units of said fluorine-containing ethylenically unsaturated compound and at least one other monomer selected from the group consisting a fluorine-free ethylenically unsaturated compound having 2 to 4 carbon atoms and a fluorine-containing diene having 4 to 8 carbon atoms, (2) at least one bromine atom liberated from a brominated compound of the formula: $RBr_x$ (wherein R is a saturated hydrocarbon residue and x is a number corresponding to the bonding valency of the residue R) in an amount of 0.001 to 10% by weight based on the polymer weight and (3) a fragment of the brominated compound excluding the said liberated bromine atom therefrom, bonded to the polymeric chain, the polymer being prepared by polymerizing said fluorine-containing ethylenically unsaturated compound with or without said other monomer in the presence of a radical producing source and the brominated compound in at least one step.

28 Claims, No Drawings

CROSS LINKABLE FLUORINE-CONTAINING POLYMER

The present invention relates to an easily cross linkable fluorine-containing polymer. More particularly, it relates to an easily cross linkable fluorine-containing polymer containing a certain specific amount of linked bromine in the molecule and a cross linkable composition comprising said fluorine-containing polymer.

Fluorine-containing polymers in an elastic or non-elastic state are often subjected to cross linking for the purpose of enhancing their characteristic properties such as mechanical strength, liquid resistance and creep resistance. Thus, it is greatly advantageous that those polymers can be easily cross linked.

It was found that a fluorine-containing elastic or non-elastic polymer containing a certain specific amount of linked iodine in the molecule which can be readily controlled in molecular weight distribution and composition is cross linkable easily and simply in the presence of a cross linking source (cf. U.S. Pat. No. 4,243,770).

As a result of an extensive study, it has now been found that a fluorine-containing polymer containing linked bromine in place of linked iodine in the molecule has superior properties to that containing linked iodine.

According to the present invention, there is provided an easily cross linkable fluorine-containing polymer comprising: (1) a polymeric chain comprising one or more polymer segments, at least one polymer segment of which consists of units of at least one fluorine-containing ethylenically unsaturated compound having 2 to 8 carbon atoms, or units of said fluorine-containing ethylenically unsaturated compound and at least one other monomer selected from the group consisting a fluorine-free ethylenically unsaturated compound having 2 to 4 carbon atoms and a fluorine-containing diene having 4 to 8 carbon atoms, (2) at least one bromine atom liberated from a brominated compound of the formula: $RBr_x$ (wherein R is a saturated hydrocarbon residue and x is a number corresponding to the bonding valency of the residue R) in an amount of 0.001 to 10% by weight based on the polymer weight and (3) a fragment of the brominated compound excluding the said liberated bromine atom therefrom, which are bonded to the polymeric chain, the polymer being prepared by polymerizing said fluorine-containing ethylenically unsaturated compound with or without said other monomer in the presence of a radical producing source and the brominated compound in at least one step.

The fluorine-containing polymer containing linked bromine of the invention is more stable than the fluorine-containing polymer containing linked iodine since bromine atom has less tendency to be cleaved from the molecule than iodine when the polymer is lightened. The brominated compound is comparatively more easily handled and obtainable than the iodinated compound. Further, when the brominated compound is used, the rate of polymerization is less deteriorated, and control of the molecular weight is easier.

The term "linked bromine" herein used is intended to mean a bromine atom linked to a carbon atom in the chain of the fluorine-containing polymer. In principal, bromine is linked to the terminal carbon atom(s). Bromine atoms are rarely linked to an intermediate carbon atom other than the terminal carbon atoms. In the present invention, the linkage between the bromine atom and the terminal carbon atom can contribute effectively to the cross linking on the curing of the fluorine-containing polymer.

In the fluorine-containing polymer of the invention, the amount of linked bromine depends on the molecular weight of the polymer and is usually from about 0.001 to 10% by weight, preferably from about 0.01 to 5% by weight. When the amount of linked bromine is smaller than 0.001% by weight, curing of the polymer is insufficient. When it exceeds 10% by weight, the heat resistance of the polymer is deteriorated. The amount of linked bromine per a molecule of the polymer is not particularly limited, provided that it is essentially one or more and the total amount of linked bromine does not exceed 10% by weight.

The carbon-bromine (C—Br) linkage of the brominated compound is a relatively weak one and is easily cleaved radically in the presence of a radical producing source. The high reactivity of the thus produced radical causes the addition growth of the monomer, and then the bromine atom is taken out from the brominated compound to stop the reaction, whereby the fluorine-containing polymer in which bromine is linked to the carbon atom at the terminal of the molecule can be obtained. The thus formed linkage of the terminal of the fluorine-containing polymer with bromine is again cleaved radically with ease in the presence of a radical producing source to produce a radical having a similar reactivity. Therefore, by changing the kind of the monomer successively and repeating the polymerization one or several times in the presence of the said fluorine-containing polymer, the addition growth of the monomer is caused at each polymerization step as mentioned above to afford a fluorine-containing segmented copolymer in which two or more kinds of segments corresponding to the kind of each monomer are chemically linked and linked bromine is present.

Thus, the fluorine-containing polymer of the invention may comprise a homopolymer or random copolymer consisting of a polymeric chain in which substantially two or more kinds of segments are chemically linked. Especially, the latter possesses various interesting properties which can not be obtained by conventional blending processes.

In the fluorine-containing polymer of the invention, the polymeric chain may consist of (1) a homopolymer segment or random copolymer segment comprising units of at least one fluorine-containing ethylenically unsaturated compound; (2) a random copolymer segment comprising units of at least one fluorine-containing ethylenically unsaturated compound and at least one fluorine-free ethylenically unsaturated compound copolymerizable therewith; (3) a segmented copolymer comprising at least two kinds of the polymer segments (1) which are chemically linked; (4) a segmented copolymer comprising at least two kinds of the copolymer segments (2) which are chemically linked; (5) a segmented copolymer comprising at least one kind of the polymer segment (1) and at least one kind of the copolymer segment (2); and (6) a segmented copolymer comprising at least one kind of the polymer segments (1) or (2) and a polymer segment comprising the fluorine-free ethylenically unsaturated compound which are chemically linked. In the case that each segment in the polymeric chain consists of two or more kinds of monomers, the same kinds of monomers may be used in varying proportion. The constituting segments are not necessarily required to be different from each other in the whole portions of the polymeric chain. The sufficient condition is that at least two kinds of segments are present in the polymeric chain and at least one of them is a fluorine-containing segment.

The brominated compound contains one or two linked bromine atoms and is stable to such an extent as undesirable side reactions do not proceed under the polymerization conditions. R is a saturated hydrocarbon residue (which may include a functional group such as —O—, —S—, RN=, —COOH, —SO$_3$H, and —PO$_3$H) usually having 1 to 8 carbon atoms. Preferred examples of the brominated compound are CF$_2$ClBr; CF$_2$Br$_2$, BrCF$_2$CF$_2$Br, CF$_3$CFBrCF$_2$Br, CH$_2$ClBr, CF$_3$Br, CH$_3$Br, CFClBr$_2$, CCl$_3$Br, CBr$_4$, CF$_2$ClCFClBr, CF$_2$ClCCl$_2$Br, CF$_2$BrCFClBr, CFBrClCFClBr, CF$_2$BrCF$_2$CF$_2$Br, CF$_2$BrCFBrCF$_2$Br, CF$_2$HCF$_2$Br, CF$_2$HCFClBr, CH$_2$BrCF$_2$H, CF$_2$BrCFH$_2$, CH$_2$BrCH$_2$F, CF$_2$BrCFHCl, CH$_3$CF$_2$Br, CF$_2$HCFHBr, CH$_3$CHFBr, CF$_2$HCFBrCF$_3$, CF$_2$BrCFHCF$_3$, (CF$_3$)$_2$CBrCH$_3$, CF$_2$HCFBrOCF$_3$, CF$_2$BrCFBrOCF$_3$, etc. Among them, CF$_2$ClBr, CF$_2$Br$_2$, BrCF$_2$CF$_2$Br and CF$_3$CFBrCF$_2$Br are more preferred. These brominated compounds may be prepared by conventional methods.

Specific examples of the fluorine-containing ethylenically unsaturated compound are tetrafluoroethylene, trifluoroethylene, vinylidene fluoride, vinyl fluoride, chlorotrifluoroethylene, hexafluoropropylene, pentafluoropropylene, perfluorocyclobutylene, perfluoro(methylcyclopropylene), perfluoroallene, α,β,β-trifluorostyrene, perfluorostyrene, perfluoroalkyl vinyl ethers (eg. perfluoro(methyl vinyl ether), perfluoro(ethyl vinyl ether), etc.), polyfluoroacrylic acid, polyfluorovinyl acetate, polyfluorovinyl ether sulfonate, polyfluorodienes, etc.

Specific examples of the fluorine-free ethylenically unsaturated compound which is copolymerizable with the fluorine-containing ethylenically unsaturated compound are ethylene, propylene, butylene, vinyl carboxylate (eg. vinyl acetate), vinyl ethers (eg. methyl vinyl ether, ethyl vinyl ether), etc.

The fluorine-containing polymer favorable for the cross linking property is the one containing substantially a an elastomeric random copolymer of vinylidene fluoride with at least one other fluoroolefin copolymerizable therewith. The most favorable one is said elastomeric random copolymer containing 30 to 65% by weight, preferably less than 50% by weight of vinylidene fluoride units and having a number average molecular weight of about 8,000 to 400,000 (determined by the osmotic pressure method). Examples of said other fluoroolefines are tetrafluoroethylene, chlorotrifluoroethylene, tetrafluoroethylene, trifluoroethylene, vinyl fluoride, hexafluoropropylene, pentafluoropropylene, perfluoro(methyl vinyl ether), perfluoro(ethyl vinyl ether), etc.

The fluorine-containing dienes are those having 4 to 8 carbon atoms, examples of which are those consisting of two terminal residues (a) CF$_2$=CF—, CF$_2$=CH— or CF$_2$=CFO— and a divalent intermediate residue (b) —(CF$_2$)$_n$—, —(CF$_2$O)$_x$—(CF$_2$CF$_2$O)$_y$—CF$_2$— or

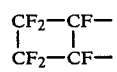

wherein n is an integer of 0 to 8, and x, y and z are each an integer of 0 to 8 and satisfy the equation: $0 < x+y+z \leq 8$, with the proviso that when n is 0, the residue (a) is other than CF$_2$=CFO—. Among them, dienes in which the residue (a) is CF$_2$=CF— or CF$_2$=CFO— and the residue (b) is —(CF$_2$)$_n$— or —(CF$_2$O)$_x$—(CF$_2$CF$_2$O)$_y$—CF$_2$— are preferred. Particularly, CF$_2$=CF—CF=CF$_2$, CF$_2$=CF—(CF$_2$)$_4$—CF=CF$_2$, CF$_2$=CF—CH=CF$_2$, CF$_2$=CH—CH=CF$_2$, CF$_2$=CF—O—(CF$_2$)$_2$—O—CF=CF$_2$, CF$_2$=CF—CF$_2$—CF=CF$_2$ and CF$_2$=CF—O—(CF$_2$)$_2$—O—CF$_2$—CF(CF$_3$)—O—CF=CF$_2$.

When units of the fluorine-containing diene is contained in the fluorine containing polymer, the molar ratio of said diene and the fluorine-containing ethylenically unsaturated compound in the polymer is $5 \times 10^{-2}$ or less. When said diene is used more than this limit, the polymer is too hard, processability such as roll milling is deteriorated and elongation of the cross linked polymer is less.

As the radical producing source to be used in the production of the fluorine-containing polymer, light or heat may be preferably employed. In case of light, infrared to ultraviolet rays, particularly not containing actinic ultraviolet rays, may be used. Actinic ultraviolet rays may produce radicals also from linkages other than the I—Br linkage and is thus not necessarily ideal. In case of initiating the reaction with heat alone, a temperature of at least 100° C., preferably 200° C. or higher is required. Ionizing radiation may be also utilized, but it produces radical indiscriminately in essence and is thus undesirable. Further, appropriate radical initiators such as inorganic or organic peroxides, azo compounds, organometallic compounds and metals may be also employed depending on the mode of the polymerization. Examples of the preferred radical initiators are persulfates, hydrogen peroxide, (R'CO)$_2$O$_2$, R'OOR', (R')$_3$COOC(O)OC(R')$_3$, N$_2$F$_2$, R'—N=N—R', HgR'$_2$ (R' being, same or different, a polyfluoroalkyl group), Li, K, Na, Mg, Hg, Al, etc.

The polymerization temperature may be optionally selected from such range as the radical reaction takes place but thermal decomposition of the produced polymer chain does not occur. Usually, a temperature of $-20°$ C. to 150° C. is adopted. In case of using heat as the radical producing source, a higher temperature, sometimes of about 250° C. is necessary.

The polymerization pressure is not critical and usually equal to or lower than the autogeneous pressure of the monomers participating in the polymerization.

As the medium for solution polymerization, one in which chain transfer is hardly caused is preferred. For example, the following solvents may be favorably employed:

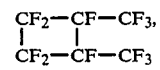

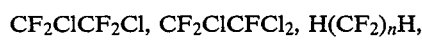

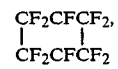

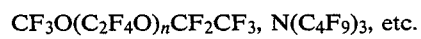

CF$_3$O(C$_2$F$_4$O)$_n$CF$_2$CF$_3$, N(C$_4$F$_9$)$_3$, etc.

In case of emulsion polymerization, the use of emulsifier is usually desirable. When the produced polymer has a surface active effect, for instance, in case of containing a hydrophilic group such as —COOM, —OH or —SO₃M (M being hydrogen, metal or any other cation), the use of an emulsifier in not necessarily required. As the emulsifier, a fluorine-containing one such as a salt of fluorine-containing carboxylic acid or fluorine-containing sulfonic acid is favorably employed. The amount of the emulsifier to be used is usually 5% by weight or less to the amount of water. A chain transfer agent may be also employed, but generally a desirable result is not obtained.

In the present invention, any of the fluorine-containing polymers in liquid or solid state may be employed, provided that it contains the C—Br bond. Some of the fluorine-containing polymers show an intrinsic viscosity [η] (dl/g) of about 0.01 or larger, preferably 0.15 to 2.0, when determined at 35° C. in a solvent being able to dissolve the polymer (for instance, the solvent described in Examples below).

The brominated polymer, particularly the brominated elastomeric copolymer of the invention is cross linkable characteristically as mentioned above in the presence of a cross linking source. As the cross linking source, high energy electromagnetic waves such as radioactive rays (eg. gamma rays, electron rays, alpha rays, beta rays, X-rays) and ultraviolet rays may be employed, but the use of cross linking agents such as organic peroxides, polyamines, polyhydroxy compounds and polythiols are more favorable. Particularly, when the organic peroxides or the polyamines are used as the cross linking agent, the copolymer of the invention shows characteristic cross linking properties, and the cross linked copolymer has improved physical properties. Thus, the copolymer containing the linked bromine in the molecule, particularly the elastomeric copolymer of the invention can be cross linked with the peroxides more easily than a fluorine-containing elastomeric polymer not containing bromine. When the polyamine is used as the cross linking agent, the rate of the cross linking is improved, and when the peroxide is used, the compression set of the cross linked polymer is improved. The amount of such cross linking agent to be used is usually from 0.05 to 10 parts by weight, preferably from 1.0 to 5 parts by weight to 100 parts by weight of the polymer.

As the organic peroxide, the one readily producing a peroxy radical under heating or in the oxidation-reduction system is usually desired. Examples of such peroxides are 1,1-bis(t-butylperoxy)-3,5,5-trimethylcyclohexane, 2,5-dimethylhexane-2,5-dihydroxyperoxide, di-t-butylperoxide, t-butylcumylperoxide, dicumylperoxide, α,α′-bis(t-butylperoxy)-p-diisopropylbenzene, 2,5-dimethyl-2,5-di(t-butylperoxy)hexane, 2,5-dimethyl-2,5-di(t-butylperoxy)hexene-3, benzoylperoxide, t-butylperoxybenzene, 2,5-dimethyl-2,5-di(benzoylperoxy)hexane, t-butylperoxymaleic acid, t-butylperoxyisopropyl carbonate, etc. Among them, the dialkyl type compound is most preferable. In usual, the kind and amount of the peroxide to be used are determined depending on the amount of active —O—O—, the decomposition temperature, etc.

In case of using the organic peroxide, a remarkable effect can be obtained by the combined use of a cross linking aid or a co-cross linking agent. As the cross linking aid or co-cross linking agent, any one having a reactivity to peroxy and polymer radicals may be effectively employed in principle. Preferable examples are trially cyanurate, triallyl isocyanurate, triacrylformal, triallyl trimellitate, N,N′-m-phenylenebismaleimide, dipropargyl terephthalate, diallyl phthalate, tetraallyl terephthalamide, triallyl phosphate, etc. The amount to be used is 0.1 to 10 parts, preferable 0.5 to 5 parts to 100 parts of the polymer. Further, as a blendable co-cross linking substance, silicone oil, silicone rubber, ethylene-vinyl acetate copolymer, 1,2-polybutadiene, fluorosilicone oil, fluorosilicone rubber, fluorophosphazen rubber, hexafluoropropylene-ethylene copolymer, tetrafluoroethylene-propylene copolymer and other polymers having radical reactivity or amine activity may be also employed. The fluorine-containing polymer of the invention which can have an olefin structure by bromine eliminating reaction by utilizing the reactivity of the terminal bromine is also used as the blendable co-cross linking substance. The amount of such substance to be used is not particularly limited, but it is not desirable to use it in such a large amount as deteriorating the essential quality of the fluorine-containing polymer.

The polyamine may be a primary or secondary amine having two or more basic nitrogen atoms in the molecule. In many cases, it is used in a salt form so as to make the reactivity milder. In usual, the use of alkylenediamines, especially, ethylenediamine carbamate, hexamethylenediamine carbamate, 4,4′-diaminocyclohexylmethane carbamate, etc. is preferable. Schiff's bases such as N,N′-dicinnamylidene-1,6-hexamethylenediamine are also employed frequently. Further, poorly basic aromatic polyamines may be employed advantageously in combination with other basic compounds. Examples of the other basic compounds are diphenylguanidine, di-O-triguanidine, diphenylthiourea, 2-mercaptoimidazoline, etc. Accelerators for synthetic rubbers containing —NH₂ and/or —NH— in the molecule, divalent metal hydroxide and the like are also usable. The amount of the polyamine compound to be used is about 0.5 to 5 parts to 100 parts of the polymer.

As the polyhydroxy compound, there may be employed polyhydroxy compounds containing an enol type hydroxy group

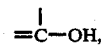

dihydroxy compounds represented by the formula: R″(CH₂OH)₂ (wherein R″ is a polyfluoroalkylene or perchlorofluoroalkylene group having 1 to 20 carbon atoms) or their alkali metal salts, or their mixture. Preferable examples of such compounds are hydroquinone, 2,2-bis(4-hydroxyphenyl)propane, 2,2-bis(4-hydroxyphenyl)perfluoropropane, 2,2-bis(4-hydroxyphenyl)butane, 1,1-bis(4-hydroxyphenyl)methane, 4,4′-dihydroxydiphenyl ether, HOCH₂(CF₂)₃CH₂OH, HOCH₂CF₂CFH(CF₂)₃CFHCF₂CH₂OH, HO(CH₂)₃(CF₂)₃(CH₂)₃OH, HOCH₂CF₂CH₂(CF₂)₃CH₂CF₂CH₂OH or their alkali metal salts.

As the polythiols, aliphatic or aromatic dithiols are usually employed. Specific examples thereof are dimercaptodimethyl ether, dimercaptomethyl sulfide, 1,6-hexanedithiol, ethylenebismercapto acetate, 1,5-naphthalene dithiol, 4,4′-dimethylmercaptodiphenyl, triazine-substituted thiol or their alkali metal salts.

The cross linking of the polymer of the invention is effected in the presence of a divalent metal oxide or hydroxide as an acid acceptor in addition to the above mentioned cross linking source. The divalent metal oxide or hydroxide may be, for example, an oxide or hydroxide of Ca, Mg, Pb, Zn, etc. Their complex salts may be also utilizable. These compounds not only serve as the acid acceptor but also contribute to improvement of the cross linking reactivity, the mechanical properties and the heat resistance. Further, suitable cross linking accelerators such as tertiary amines, trisubstituted amidines, pentasubstituted guanidines or their organic or inorganic acid salts, quarternary ammonium salts or quarternary phosphonium salts may be also employed. As to such cross linking accelerators, detailed description is given in Japanese Patent Publication (unexamined) Nos. 56854/1976, 1387/1972 and 191/1972. For the purpose of bromine-elimination of the polymer of the invention, weak acid salts of monovalent metal such as Na, K, Ag and Cu may be employed.

The composition of the invention may also contain pigments, fillers, reinforcing agents, etc. Preferable examples of the fillers or the reinforcing agents are carbon black, $TiO_2$, $SiO_2$, clay and talk as inorganic materials and fluorine-containing polymers such as polyteterafluoroethylene, polyvinylidene fluoride, polyvinyl fluoride, polychlorotrifluoroethylene, tetrafluoroethylene-ethylene copolymer and tetrafluoroethylene-vinylidene fluoride copolymer as organic materials.

The mixing of the above compounds may be effected by an appropriate procedure depending on their viscoelasticity and state. In case of the solid compounds, a conventional open roll or powder mixer is usable. In case of the liquid ones, a conventional mixer may be employed. It is also possible to dissolve or disperse the solid compounds to obtain a dispersed mixture.

The fluorine-containing polymer of the invention may be used, for example, as a plastic material, a sealant, an adhesive or a paint in the field where resistances against heat, oil, chemicals, solvents, etc. are highly desired.

The present invention will be hereinafter explained further in detail by the following Examples.

EXAMPLE 1

In a 3.26 l volume reaction tank, pure water (1 l) was charged, and air in the tank was replaced by nitrogen gas. After addition of $CF_2ClBr$ ($9.64 \times 10^{-3}$ mol), a gaseous mixture of vinylidene fluoride (hereinafter referred to as "VdF") and hexafluropropylene (hereinafter referred to as "HFP") (molar ratio, 50:50) was introduced at 80° C. with stirring to pressurize the tank to 14 Kg/cm²G. Then, a solution of ammonium persulfate (0.93 g) in water (50 ml) was charged in the tank under pressure with nitrogen gas to initiate polymerization reaction. When the pressure dropped with the progress of the reaction, a gaseous mixture of VdF/HFP (molar ratio, 78:22) was introduced to keep the pressure 14 Kg/cm²G during the polymerization. After 2.5 hours, the temperature was lowered rapidly and unreacted monomers were discharged to terminate the reaction. An aqueous emulsion containing 24.4% by weight of solid was obtained.

Coagulation of a part of the thus obtained emulsion by the addition of potash alum (5% by weight) followed by washing with water and drying gave the elastomeric copolymer having an intrinsic viscosity [$\eta$] of 0.46 dl/g (35° C. in tetrahydrofuran). Its bromine content was 1,210 ppm.

EXAMPLE 2

In the same manner as in Example 1 but using $CF_2BrCF_2Br$ ($5.50 \times 10^{-3}$ mol) in place of $CF_2ClBr$, using 0.50 g of ammonium persulfate and effecting the reaction for 185 minutes, polymerization was carried out to obtain an aqueous emulsion containing 24.6% by weight of solid. The obtained elastomeric polymer had an intrinsic viscosity [$\eta$] of 0.77 dl/g (35° C. in tetrahydrofuran) and contained 1,100 ppm of bromine.

EXAMPLE 3

In a 36.6 l volume reaction tank, pure water (15 l) and ammonium perfluorooctanate (30 g) were charged, and air in the tank was replaced by nitrogen gas. A gaseous mixture of VdF/HFP (molar ratio, 50:50) (1,070 g) was introduced and the interior temperature was raised to 80° C. with stirring. Then, a solution of ammonium persulfate (0.2 g) in water (50 ml) was charged in the tank under pressure with nitrogen gas to initiate polymerization reaction. When the pressure dropped with the progress of the reaction, a gaseous mixture of VdF/HFP (molar ratio, 78:22) was introduced to keep the pressure 12 Kg/cm²G during the polymerization. After 2 hour, $CF_3CFBrCF_2Br$ (15.5 g) was added under pressure with nitrogen gas. During the reaction, ammonium persulfate was consumed and the reaction rate was decreased. In order to maintain the reaction rate, ammonium persulfate (0.1 to 0.2 g) in water (50 ml) was charged under pressure with nitrogen gas every 3 hours. After 24 hours, the temperature was lowered rapidly and unreacted monomers were discharged to terminate the reaction. An aqueous emulsion containing 11.7% by weight of solid was obtained.

Coagulation of a part of the thus obtained emulsion by the addition of potash alum (5% by weight) followed by washing with water and drying gave the elastomeric copolymer having an intrinsic viscosity [$\eta$] of 0.43 dl/g (35° C. in tetrahydrofuran). Its bromine content was 2,800 ppm.

EXAMPLE 4

In the same manner as in Example 3 but using 7.75 g of $CF_3CFBrCF_2Br$ and effecting the reaction for 19 hours, polymerization was carried out to obtain an aqueous emulsion containing 12.5% by weight of solid. The obtained elastomeric copolymer had an intrinsic viscosity [$\eta$] of 0.66 dl/g (35° C. in tetrahydrofuran) and contained 1,200 ppm of bromine.

COMPARATIVE EXAMPLE 1

In a 36.6 l volume reaction tank, pure water (15 l) was charged, and air in the tank was replaced by nitrogen gas. A gaseous mixture of VdF/HFP (molar ratio, 65:35) (1,100 g) was introduced, and the interior temperature was raised to 80° C. with stirring. Then, a solution of ammonium persulfate (25.6 g) in water (100 ml) and isopentane (0.2 g) were charged in the tank under pressure with nitrogen gas to initiate polymerization reaction. Then, aqueous solution of ammonium persulfate (concentration, 161 g/l) was added at a rate of 1 ml/min. to compensate the decomposed ammonium persulfate and to maintain its concentration constant. Simultaneously, isopentane was added at a rate of 0.0046 g/min. to compensate its consumption.

When the pressure dropped with the progress of the reaction, a gaseous mixture of VdF/HFP (molar ratio, 78:22) was introduced to keep the pressure 12 Kg/cm²G during the polymerization. After 185 minutes, heating and stirring were stopped to terminate the reaction. From a part of the thus produced aqueous emulsion, the elastomeric copolymer (4,760 g) was recovered, which had a number average molecular weight of 70,000 (measured by an osmotic pressure method) and an intrinsic viscosity [η] of 0.66 dl/g (35° C. in tetrahydrofuran).

EXAMPLES 5 TO 8 AND COMPARATIVE EXAMPLES 2 AND 3

The components as shown in Table 1 were blended uniformly by rubber rolls according to a conventional method.

A vulcanization test of the composition was effected by the aid of a JSR Curastometer II type. 100% Tention ($M_{100}$), tensile strength ($T_B$), elongation ($E_B$) were measured according to JIS K 6301. The results are shown in Table 2.

TABLE 1

| | Example | | | | Comparative Example | |
|---|---|---|---|---|---|---|
| | 5 Exam. 1 | 6 Exam. 2 | 7 Exam. 3 | 8 Exam. 4 | 2 Comp. Exam. 1 | 3 Comp. Exam. 1 |
| Polymer | | | | | | |
| Composition (parts) | | | | | | |
| Polymer | 100 | 100 | 100 | 100 | 100 | 100 |
| MT carbon black | 20 | 20 | 20 | 20 | 20 | 20 |
| MgOMA-150 | 3 | 3 | — | — | 3 | — |
| Ca(OH)$_2$ | 6 | 6 | 6 | — | 6 | — |
| Bisphenol AF | 2 | 2 | — | — | 2 | — |
| DBU-B | 0.35 | 0.35 | — | — | 0.35 | — |
| Perhexa 2.5B | — | — | 1.5 | 1.5 | — | 1.5 |
| Triallyl isocyanurate | — | — | 4.0 | 4.0 | — | 4.0 |

TABLE 2

| | Example | | | | Comparative Example | |
|---|---|---|---|---|---|---|
| | 5 | 6 | 7 | 8 | 2 | 3 |
| Vulcanization test (curastometer) | | | | | | |
| Temperature | 170° C. | 170° C. | 160° C. | 160° C. | 180° C. | 170° C. | 160° C. | 180° C. |
| v min. (Kgf) | 0.34 | 0.23 | 0.33 | 0.72 | 0.65 | 0.38 | 0.15 | 0.15 |
| v (Kgf) | 4.34 | 4.44 | 1.70 | 1.35 | 2.10 | 3.96 | 0.35 | 0.40 |
| $T_{10}$ (min.) | 2.8 | 3.4 | 1.8 | 1.5 | 0.5 | 4.3 | — | — |
| $T_{90}$ (min.) | 4.0 | 4.7 | 11.0 | 6.2 | 1.5 | 9.2 | — | — |
| R (min.) | 1.2 | 1.3 | 9.2 | 4.7 | 1.0 | 4.9 | | |
| Primary Vulcanization | 170° C. × 10 min. | | 160° C. × 15 min. | | | 170° C. × 10 min. | 160° C. × 15 min. | |
| Secondary Vulcanization | 230° C. × 24 hrs. | | 180° C. × 4 hrs. | | | 230° C. × 24 hrs. | | |
| $M_{100}$ (Kgf/cm$^2$) | 48 | 62 | 20 | 19 | | 58 | Vulcanized rubber sheet not obtained due to foaming | |
| $T_B$ (Kgf) | 147 | 159 | 120 | 154 | | 150 | | |
| $E_B$ (%) | 200 | 190 | 710 | 680 | | 190 | | |
| Hardness (JIS, Hs) | 73 | 77 | 74 | 70 | | 75 | | |

During the reaction, ammonium persulfate was consumed and the reaction rate was decreased. In order to maintain the reaction rate, ammonium persulfate (0.1 to 0.2 g) in water (50 ml) was charged under pressure with nitrogen gas every 3 hours. After 23 hours, the temperature was lowered rapidly and unreacted monomers were discharged to terminate the reaction. An aqueous emulsion was obtained.

Coagulation of the thus obtained emulsion by the addition of potash alum followed by washing with water and drying gave the elastomeric copolymer (5,208 g) having an intrinsic viscosity [η] of 0.80 dl/g (35° C. in tetrahydrofuran). Its VdF content was 44.85%.

COMPARATIVE EXAMPLE 4

In a 36.6 l volume reaction tank, pure water (15 l) was charged, and air in the tank was replaced by nitrogen gas. A gaseous mixture of TFE/VdF/HFP (molar ratio, 16.5:46.5:37.0) (864 g) was introduced and the interior temperature was raised to 98° C. with stirring. Then, a solution of ammonium persulfate (25.5 g) in water (100 ml) was charged in the tank under pressure with nitrogen gas to initiate polymerization reaction. When the pressure dropped with the progress of the reaction, a gaseous mixture of TFE/VdF/HFP (molar ratio, 21.0:61.0:18.0) was introduced to keep the pressure 10 Kg/cm$^2$G during the polymerization. During the reaction, ammonium persulfate was consumed and the reaction rate was decreased. After 110 minutes, in order to maintain the reaction rate, ammonium persulfate was continuously charged at a rate of 12 mg/min. by means of a pump under pressure. After 130 minutes,

EXAMPLE 9

In a 36.6 l volume reaction tank, pure water (15 l) and ammonium perfluorooctanate (30 g) were charged, and air in the tank was replaced by nitrogen gas. A gaseous mixture of tetrafluoroethylene (hereinafter referred to as "TFE")/VdF/HFP (molar ratio, 16.5:46.5:37.0) (1,300 g) was introduced and the interior temperature was raised to 80° C. with stirring. Then, a solution of ammonium persulfate (0.2 g) in water (50 ml) was charged in the tank under pressure with nitrogen gas to initiate polymerization reaction. When the pressure dropped with the progress of the reaction, a gaseous mixture of TFE/VdF/HFP (molar ratio, 21.0:61.0:18.0) was introduced to keep the pressure 12 Kg/cm$^2$G during the polymerization. After 2 hour, $CF_3CFBrCF_2Br$ (51 g) was added under pressure with nitrogen gas.

the temperature was lowered rapidly and unreacted monomers were discharged to terminate the reaction. An aqueous emulsion was obtained.

Coagulation of the thus obtained emulsion by the addition of potash alum followed by washing with water and drying gave the elastomeric copolymer (4,560 g) having an intrinsic viscosity [η] of 0.85 dl/g (35° C. in tetrahydrofuran). Its VdF content was 44.85%.

EXAMPLES 10 TO 11 AND COMPARATIVE EXAMPLES 5 TO 6

The components as shown in Table 3 were blended uniformly by rubber rolls according to a conventional method.

Vulcanization test of the composition was effected by the aid of a JSR Curastometer II type. 100% Tention ($M_{100}$), tensile strength ($T_B$), elongation ($E_B$), hardness and compression set (CS) were measured according to JIS K 6301. The results are shown in Table 4.

TABLE 3

| Polymer | Exam. 10 Exam. 9 | Comp. Exam. 5 Comp. Exam. 4 | Exam. 11 Exam. 9 | Comp. Exam. 6 Comp. Exam. 4 |
|---|---|---|---|---|
| Composition (parts) | | | | |
| Polymer | 100 | 100 | 100 | 100 |
| Carbon | 5 | 5 | — | — |
| Graphite | 25 | 25 | — | — |
| MT carbon black | — | — | 20 | 20 |
| $2PbO \cdot Pb(HPO_3)_2 \cdot \frac{1}{2}H_2O$ | 20 | 20 | — | — |
| Triallyl isocyanurate | — | — | 4 | 4 |
| Plasticizer | 1 | 1 | — | — |
| V-4*[1] | 1.5 | 1.5 | — | — |
| Perhexa 2.5B | — | — | 1.5 | 1.5 |

Note: *[1] 4,4'-Methylene bis(cyclohexylamine)carbamate

TABLE 4

| | Exam. 10 | Comp. Exam. 5 | Exam. 11 | Comp. Exam. 6 |
|---|---|---|---|---|
| Vulcanization test (curastometer) | | | | |
| Temperature | 170° C. | 170° C. | 170° C. | 170° C. |
| ν min. (Kgf) | 0.37 | 0.43 | 0.17 | — |
| ν (Kgf) | 5.90 | 4.50 | 1.67 | — |
| $T_{10}$ (min.) | 2.0 | 2.5 | 0.9 | — |
| $T_{90}$ (min.) | 9.0 | 11.5 | 4.1 | — |
| R (min.) | 7.0 | 9.0 | 3.2 | — |
| Primary Vulcanization | 170° C. × 8 min. | | 160° × 10 min. | |
| Secondary Vulcanization | 175° C. × 22 hrs. | | 180° C. × 4 hrs. | |
| $M_{100}$ (Kgf/cm$^2$) | 115 | 106 | 27 | Vulcanized rubber sheet not obtained due to foaming |
| $T_B$ (Kgf) | 133 | 132 | 179 | |
| $E_B$ (%) | 190 | 290 | 410 | |
| Hardness (JIS, Hs) | 86 | 85 | 71 | |
| CS | 51.1 | 68.2 | — | |

What is claimed is:

1. An easily cross linkable fluorine-containing polymer comprising: (1) a polymeric chain comprising one or more polymer segments, at least one polymer segment of which consists of units of at least one fluorine-containing ethylenically unsaturated compound having 2 to 8 carbon atoms, or units of said fluorine-containing ethylenically unsaturated compound and at least one other monomer selected from the group consisting of a fluorine-free ethylenically unsaturated compound having 2 to 4 carbon atoms and a fluorine-containing diene having 4 to 8 carbon atoms, (2) at least one bromine atom linked to a terminal carbon atom liberated from a brominated compound of the formula: $RBr_x$, wherein R is a saturated hydrocarbon residue and x is a number corresponding to the bonding valency of the residue, in an amount of 0.001 to 10% by weight based on the polymer weight and (3) a fragment of the brominated compound excluding said liberated bromine atom therefrom bonded to the polymeric chain, said polymer being prepared by polymerizing said fluorine-containing ethylenically unsaturated compound with or without said other monomer in the presence of a radical producing source and said brominated compound in at least one step.

2. The fluorine-containing polymer according to claim 1, wherein the content of bromine in the polymer is from 0.01 to 5% by weight.

3. The fluorine-containing polymer according to claim 1, wherein R is a saturated hydrocarbon group having 1 to 8 carbon atoms.

4. The fluorine-containing polymer according to claim 1, wherein x is 1 or 2.

5. The fluorine-containing polymer according to claim 1, wherein R is a saturated fluorohydrocarbon group.

6. The fluorine-containing polymer according to claim 1, wherein the polymeric chain comprises at least two polymer segments.

7. The fluorine-containing polymer according to claim 1, wherein the polymeric chain comprises an elastomeric random copolymer of vinylidene fluoride with at least one other fluoroolefin copolymerizable therewith.

8. A cross linking composition comprising a mixture of (A) the fluorine-containing polymer according to claim 1 and (B) at least one cross linking agent in a weight ratio of 100:0.05–10.

9. The cross linking composition according to claim 8, wherein the cross linking agent is one selected from the group consisting of organic peroxide, polyamines and their salts, polyhydroxy compounds having an enol type hydroxyl group and dihydroxy compound of the formula: $R''(CH_2OH)_2$ (wherein $R''$ is a polyfluoroalkylene or perchlorofluoroalkylene group having 1 to 20 carbon atoms) and their alkali metal salts, and polythiols and their alkali metal salts.

10. The cross linking composition according to claim 8, wherein the component (A) is a fluorine-containing elastomeric copolymer in which the polymeric chain comprises a random copolymer of vinylidene fluoride with at least one other fluoroolefin copolymerizable therewith.

11. The cross linking composition according to claim 9, wherein the cross linking agent is an organic peroxide.

12. The cross linking composition according to claim 9, wherein the cross linking agent is a polyamine or its salt.

13. The cross linking composition according to claim 9, wherein the cross linking agent is a polyhydroxy compound having an enol type hydroxyl group or dihydroxy compound of the formula: $R''(CH_2OH)_2$ (wherein $R''$ is a polyfluoroalkylene or perchlorofluoroalkylene group having 1 to 20 carbon atoms) or their alkali metal salts.

14. The cross linking composition according to claim 9, wherein the cross linking agent is the polythiol or its alkali metal salt.

15. The cross linking composition according to claim 8, which further comprises an acid acceptor.

16. The cross linking composition according to claim 15, wherein the acid acceptor is a divalent metal oxide or hydroxide.

17. The cross linking composition according to claim 8, which further comprises an accelerating agent.

18. The cross linking composition according to claim 17, wherein the accelerating agent is one selected from the group consisting of tertiary amines, trisubstituted amidines, pentasubstituted guanidines and their organic or inorganic acid salts, quaternary ammonium salts and quaternary phosphonium salts.

19. The cross linking composition according to claim 8, which further comprises a cross linking aid or a co-cross linking agent.

20. The cross linking composition according to claim 19, wherein the cross linking aid or the co-cross linking agent is a polyfunctional compound.

21. An easily cross linkable fluorine-containing polymer comprising: (1) a polymeric chain comprising one or more polymer segments, at least one polymer segment of which consists of units of at least one fluorine-containing ethylenically unsaturated compound having 2 to 8 carbon atoms selected from the group consisting of tetrafluoroethylene, trifluoroethylene, vinylidene fluoride, vinyl fluoride, chlorotrifluoroethylene, hexafluoropropylene, pentafluoropropylene, perfluorocyclobutylene, perfluoro(methylcyclopropylene), perfluoroallene, $\alpha,\alpha,\beta$-trifluorostyrene, perfluorostyrene, perfluoroalkyl vinyl ethers, polyfluoroacrylic acid, polyfluorovinyl acetate, polyfluorovinyl ether sulfonate and polyfluorodienes, or units of said fluorine-containing ethylenically unsaturated compound and at least one other fluorine-free ethylenically unsaturated monomer having 2 to 4 carbon atoms selected from the group consisting of ethylene, propylene, butylene, vinyl carboxylate and vinyl ethers and a fluorine-containing diene having 4 to 8 carbon atoms, said diene consisting of two terminal residues (a) $CF_2=CF-$, $CF_2=CH-$ or $CF_2=CFO-$ and a divalent intermediate residue (b) $-(CF_2)_n-$, $-(CF_2O)_x-(CF_2CF_2O)_y-(CF_2)-$, or

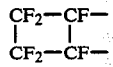

wherein n is an integer of 0 to 8, and X, Y and Z are each an integer of 0 to 8 and satisfy the equation: $0 < x+y+z \leq 8$, with the proviso that when n is 0, the residue (a) is other than $CF_2=CFO-$, (2) at least one bromine atom linked to a terminal carbon atom liberated from a brominated compound of the formula: $RBr_x$, wherein R is a saturated hydrocarbon residue and X is a number corresponding to the bonding valency of the residue R, in an amount of 0.001 to 10% by weight based on the polymer weight and (3) a fragment of the brominated compound excluding said liberated bromine atom bonded to the polymeric chain, said polymer being prepared by the addition polymerization of said fluorine-containing ethylenically unsaturated compound with or without said other monomer in the presence of a radical producing source and said brominated compound in at least one step.

22. The fluorine-containing polymer according to claim 1, which has an intrinsic viscosity $[\eta]$ (dl/g) of 0.15 to 2.0 when measured at 35° C. in a solvent capable of dissolving the polymer.

23. An easily cross linkable fluorine-containing polymer comprising: (1) a polymeric chain comprising one or more polymer segments, at least one polymer segment of which consists of units of at least one fluorine-containing ethylenically unsaturated compound selected from the group consisting of vinylidene fluoride, hexafluoropropylene and tetrafluoroethylene or units of said fluorine-containing ethylenically unsaturated compound and at least one other monomer selected from the group consisting of a fluorine-free ethylenically unsaturated compound having 2 to 4 carbon atoms and a fluorine-containing diene having 4 to 8 carbon atoms, (2) at least one bromine atom linked to a terminal carbon atom liberated from a brominated compound of the formula: $RBrHD\ x$, wherein R is a saturated hydrocarbon residue and x is a number corresponding to the bonding valency of the residue R, in an amount of 0.01 to 5% by weight based on the polymer weight and (3) a fragment of the brominated compound excluding said liberated bromine atom therefrom bonded to the polymeric chain, said polymer being prepared by polymerizing said fluorine-containing ethylenically unsaturated compound with or without said other monomer in the presence of a radical producing source and said brominated compound in at least one step.

24. The fluorine-containing polymer according to claim 23, which is a copolymer of vinylidene fluoride and hexafluoropropylene.

25. The fluorine-containing polymer according to claim 23, which is a terpolymer of tetrafluoroethylene, vinylidene fluoride and hexafluoropropylene.

26. A cross linking composition, comprising: a mixture of (A) the fluorine-containing polymer according to claim 23 and (B) at least one cross linking agent in a weight ratio of 100:0.05–10.

27. A cross linking composition, comprising: a mixture of (A) the fluorine-containing polymer according to claim 24 and (B) at least one cross linking agent in a weight ratio of 100:0.05–10.

28. A cross linking composition, comprising: a mixture of (A) the fluorine-containing polymer according to claim 25 and (B) at least one cross linking agent in a weight ratio of 100:0.05–10.

* * * * *